Sept. 22, 1959     J. L. STABLEFORD     2,905,053
PICTURE PROJECTION SCREEN AND SURROUND
Filed Nov. 16, 1953     3 Sheets-Sheet 1

Inventor
John Leslie Stableford

By
Richardson, David and Morton
Attorneys

Sept. 22, 1959         J. L. STABLEFORD         2,905,053
PICTURE PROJECTION SCREEN AND SURROUND
Filed Nov. 16, 1953                            3 Sheets-Sheet 3
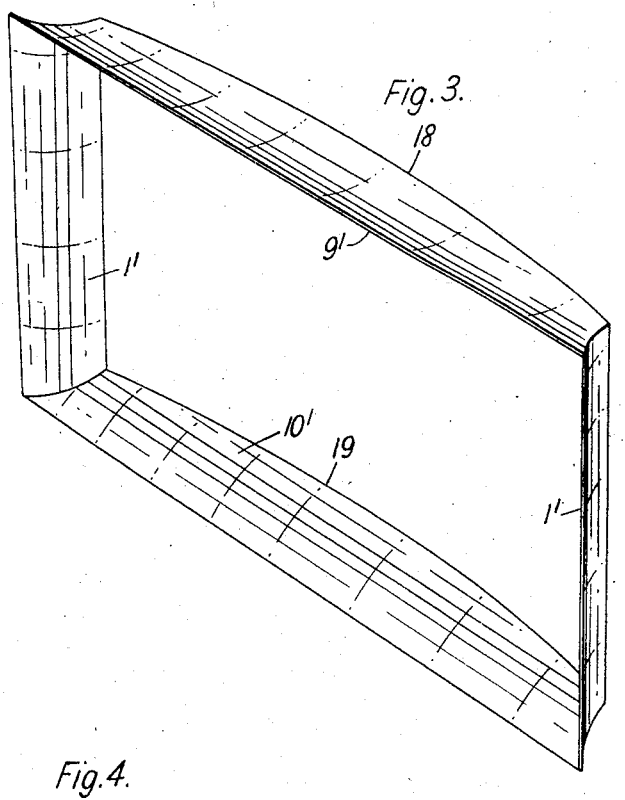
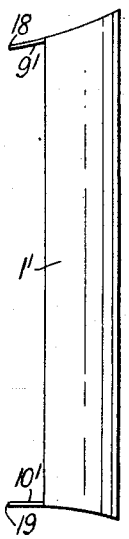
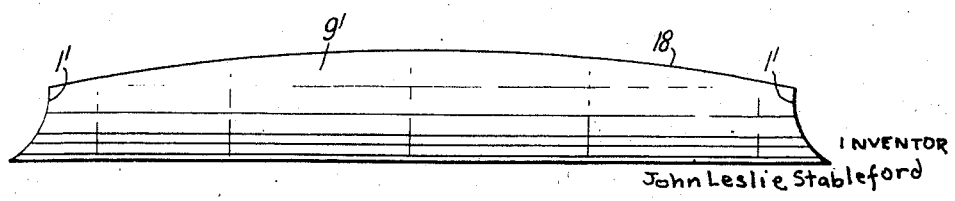
INVENTOR
John Leslie Stableford
By Richardson, Davies Morton  Attorneys

United States Patent Office 2,905,053
Patented Sept. 22, 1959

2,905,053

PICTURE PROJECTION SCREEN AND SURROUND

John Leslie Stableford, London, England

Application November 16, 1953, Serial No. 392,448

Claims priority, application Great Britain
November 15, 1952

4 Claims. (Cl. 88—28.9)

This invention concerns means for avoiding, in picture projection, the presence of a contrasting surround to a picture projected on to a projection screen. The invention is primarily concerned with front projection, that is to say cinematograph or television projection in which a picture is projected on to a screen on the same side thereof as that on which the viewers are situated.

It is well known that when a picture is projected by a motion picture or similar projector on a projection screen, the edges of the picture are inherently fuzzy. If the screen is larger than the projected picture, the peripheral fuzz will be objectionably noticeable and distracting. It is customary to eliminate this fuzzy edge effect by placing a black surround on the projection surface, the dimensions of the surround being such that the fuzzy edges of the picture are projected on the dark surround and thus rendered effectively invisible. Where the projection screen has a diffuse reflecting surface, such as that obtained with the conventional matt-white screen, the difference in brightness between the picture area and the surround or mask bordering such picture area is tolerable; however, with the advent of modern projection screens having partially-specular reflecting surfaces which give rise to a picture of very great brightness, the difference in brightness between the picture area and the mask or surround is so great that viewers suffer considerable eye-strain and their gaze is distracted from the edges of the picture and tends to become concentrated at the centre of the picture area. Moreover, the very positive and high contrast boundary of the picture area gives an unreal atmosphere so that the viewers are always conscious of the fact that it is only a projected picture they are viewing. By "partially-specular" is meant a reflecting surface which is partially light diffusing but to a lesser extent than a matt white surface, and which, at the same time, is as nearly like a mirror in its light reflecting properties as is possible without the production of a noticeable virtual image. Thus, with a partially-specular projection screen, such as is commonly used in outdoor motion picture projection, the outdoor projection may be started while the ambient light level is considerably above that at which projection may be commenced with a matt white projection surface. This is particularly true when the partially-specular projection surface is shielded and so inclined that it does not directly reflect the sky. When using a partially-specular projection screen, the projected picture is extremely brilliant, and at the same time, the effects of ambient stray light are minimized.

Attempts have been made hitherto to reduce the contrast between the picture area and the surround or mask of a diffuse reflecting surface-projection screen in order to overcome the disadvantages and distractions caused by the extreme difference in brightness between the picture area and such surround or mask. Thus it has been proposed to extend the diffuse reflecting surface of the screen beyond the picture area, such extended diffuse reflecting surfaces either lying in the plane of the picture area or being inclined thereto.

The extension of the projection screen beyond the picture area is unsatisfactory. In the case of motion picture projection, difficulties are encountered because the aperture plate or film gate does not lie exactly in the same plane as the picture area of the film and hence is not sharply focussed on the screen so that the projected picture does not have sharp edges but is bordered by blurring or "fuzz" as stated above. This "fuzz," which often extends several inches into the picture area, is also aggravated by diffraction of light at the edges of the aperture plate or film gate and by the great magnification of unavoidable slight irregularities in such edges.

A further defect arising out of the use of extended reflecting surfaces lying in the plane of the picture area is the "keystone" appearance of the picture; thus any projection rake relative to the central normal to the picture area produces a picture which has its top edge shorter than its bottom edge, whilst if the projector is offset laterally of the central normal to the picture area, one vertical side edge of the picture will be shorter than the other. Since the edges of the picture will be in focus on the extended reflecting surfaces, the combined marginal fuzz and keystone appearance of the picture will be clearly visible to viewers and hence distracting.

Where the said extended reflecting surfaces are inclined to the plane of the picture area, it has been found necessary for the projected picture to be rigidly confined to the picture area of the screen, since any spill-over of the picture to the extended reflecting surfaces gives rise to a distracting marginal extension of the picture in a different light key and also to degradation of the picture contrast at the edge of the picture by reason of the reflection of the light from the said extended reflecting surfaces back to the picture area of the screen.

Such rigid confinement of the projected picture is very difficult, if not impossible, to obtain in practice since any relative movement between the projector and the screen will give rise to spill-over of the picture on to the extended reflecting surfaces, and moreover, the keystone effect mentioned above and resulting from positioning the projector other than on a central axis normal to the picture area of the screen will inevitably give rise to spill-over of parts of the picture on to the extended reflecting surfaces.

It is an object of this invention to provide a projection screen arrangement having extended reflecting surfaces so disposed that spill-over of the projected picture on to the said extended reflecting surface does not cause serious degradation of contrast in the picture area proper and in which the brightness of the picture area is compatible with the brightness of the said extended reflecting surfaces and the brightness of the latter decreases gradually proceeding away from the picture area itself until at the edges of the extended surfaces, their brightness is such that the outer edge portions are not noticeable.

According to this invention there is provided, for use with a partially-specular projection screen having the characteristics described above, lateral, upper and lower convexly curved partially-specular extended reflecting surfaces, the tangential planes to the inner margins of said extended reflecting surfaces being substantially normal to the plane of the aperture defined by the inner margins of such surfaces. The inner margins of the reflecting surfaces define the periphery of the picture area of the screen and the portions adjacent to these inner margins receive the marginal "fuzz," referred to above. The marginal fuzz is thus projected on steeply inclined partially-specular surfaces so that its effective illumination intensity is reduced. Moreover, the fuzz itself is thus dispersed and the illumination level at the outer periphery of the picture is always compatible with the overall effective illumination level of the complete projected picture, considered as a whole.

The invention will be more fully explained with reference to the accompanying drawings, in which:

Figure 3 is a front perspective view of all four extended reflecting surfaces associated with a somewhat cylindrical projection screen having curvature of its reflecting surface with respect to a vertical axis;

Figure 4 is a side elevation of the extended reflecting surfaces of Figure 3; and Figure 5 is a plan view of the extended reflecting surfaces of Figure 3.

Figure 1:
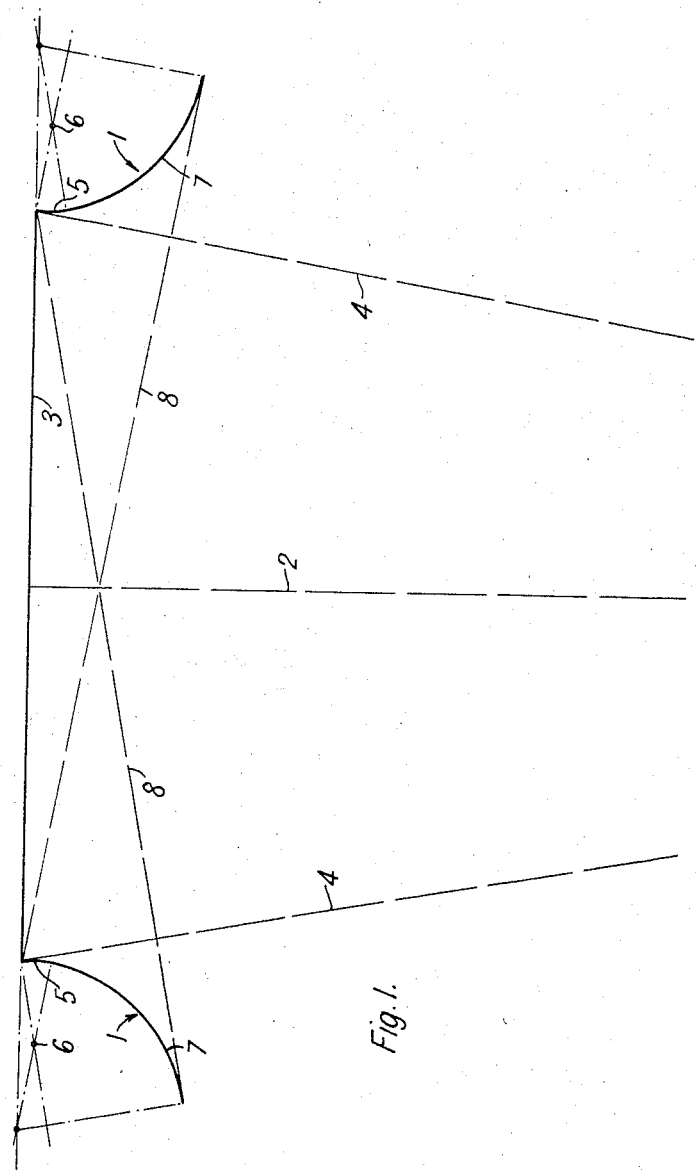
Figure 1 shows, in plan transverse section and diagrammatically, a projection screen and lateral extended reflecting surfaces in accordance with this invention.
Figure 2:
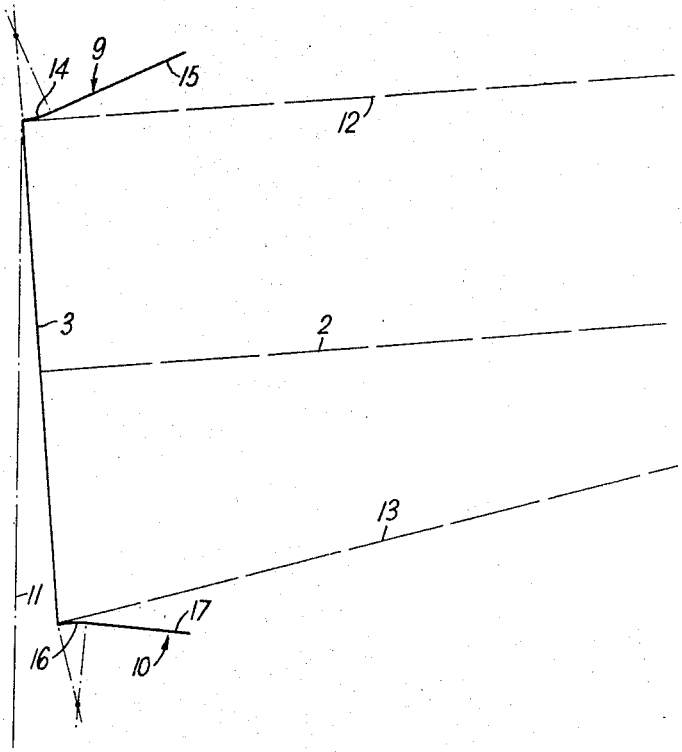
Figure 2 shows, in lateral sectional elevation and diagrammatically, a projection screen and upper and lower extended reflecting surfaces in accordance with this invention.

Figures 1 and 2 of the drawings diagrammatically illustrate the disposition and fundamental features of extended reflecting surfaces applied to a projection screen for cinematography, the figures being approximately to scale and illustrating the application of extended reflecting surfaces in accordance with this invention to a projection screen having a picture area of width to height ratio of approximately 3:2 with an overall picture area width of the order of 36 feet.

Referring particularly to Figure 1, it will be seen that the lateral extended reflecting surfaces generally designated 1 are symmetrically disposed with respect to the central normal 2 to the picture area 3.

Pictures are formed on the picture area 3 by the projection of light from a projector or the like and the lateral marginal rays incident on the picture area are represented by the broken lines 4; these broken lines 4 have been illustrated as being inclined to the normal 2 at an angle of about 10°. The marginal fuzz is located just outside the lines 4 so that it is not projected on the screen 3.

The lateral extended reflecting surfaces 1 each comprise a cylindrically curved portion 5 having its axis of curvature 6 lying in a plane perpendicular to the ray 4 at the intersection thereof with the picture area 3 so that the ray 4 will be tangential to the portion 5 at the junction of the latter and the picture area 3. The marginal fuzz is thus projected upon the portion 5 of the extended reflecting surfaces 1 which is steeply inclined with respect to the projection screen 3.

The cylindrically curved portion 5 of each lateral extended reflecting surface intersects and extends forwardly and outwardly away from the picture area 3 through an arc of approximately 20° and then merges smoothly with a further cylindrically curved portion 7 of approximately double the radius of curvature of the portion 5. The periphery of the picture area 3 is defined by the intersections with curved portions 5. The extremity of the portion 7 has a tangential plane, indicated by the broken line 8, which intersects the picture area 3 at the junction thereof with the opposite lateral extended reflecting surface.

Referring now to Figure 2, it will be seen that the picture area 3 is bounded at its upper and lower margins by upper and lower extended reflecting surfaces generally indicated 9 and 10 respectively. In this figure, the picture area 3 is shown as having a slight rearward inclination with respect to the vertical (indicated by the broken line 11), as is customary when considerable projection rake is involved, the marginal rays forming the upper and lower extremities of a picture projected on to the picture area being indicated by 12 and 13 respectively. As in the case of Fig. 1, the marginal fuzz lies just outside the picture boundary lines defined by the marginal rays indicated by the broken lines 12 and 13.

The upper extended reflecting surface is shown as comprising a cylindrically curved portion 14 which has its axis of curvature so disposed that the portion 14 is tangential to the marginal ray 12 at the junction of the portion 14 with the picture area 3. The portion 14 merges smoothly into a substantially plane portion 15 which extends away from the picture area until it intersects the vertical plane containing the free edges of the outer curved portions 7 of the lateral extended reflecting surface portions 1; the upper end of the lateral extended reflecting surfaces are preferably shaped to form a continuous connection with the upper extended reflecting surface.

The lower extended reflecting surface 10 comprises a cylindrical portion 16 having its axis of curvature so located that the lower marginal ray 13 is tangential to the portion 15 at the junction thereof with the picture area 3. The portion 15 merges smoothly into a substantially plane portion 17 which extends forwardly until it intersects the vertical plane containing the front edges of the lateral extended reflecting surfaces 1.

The above-described lateral extended reflecting surfaces may be modified to suit different sizes of picture area and the space available for installing the equipment. Thus, where a smaller picture area is employed, the cylindrical portions 5 and 7 may be interconnected by an intermediate plane or substantially plane surface, the effect of such surface being to increase the area of the lateral extended reflecting surfaces and give the picture area a greater apparent width. Where the lateral extended reflecting surfaces are to be used in conjunction with a very wide screen, then they may conveniently have a uniform curvature, i.e. be part-cylindrical in form.

The upper and lower extended reflecting surfaces may also be modified to suit varying sizes of picture area and space available for installing the equipment. Thus, the upper extended reflecting surfaces may have part-parabolic or catenary curvature and may, if so desired, be extended so that its outer extremity has a tangential plane which intersects the picture area at the junction thereof with the lower extended reflecting surface. Similarly, the lower extended reflecting surface may have part-parabolic or catenary curvature.

Thus, Figures 3, 4 and 5 illustrate a practical arrangement of the extended reflecting surfaces adapted for use where there is not a great deal of space available for installing the equipment. In these figures, the lateral extended reflecting surfaces 1' have simple cylindrical curvature. It will be observed that the tangential plane to each extremity of the lateral extended reflecting surfaces does not intersect the picture area at the junction thereof with the other lateral extended reflecting surface as shown in Fig. 1, so that optimum conditions are not attained, as hereinafter explained, but the primary effect of the lateral extended reflecting surfaces, namely to eliminate a sharp boundary to the picture area, is nevertheless maintained. The upper and lower extended reflecting surfaces 9' and 10' respectively are also of simple cylindrical curvature. As previously described in connection with Figs. 1 and 2, the marginal fuzz of the projected picture falls on the steeply inclined portions of the partially-specular extended reflecting surfaces 1', 1', 9' and 10' where the fuzz is dispersed and reflected away from the picture area of the projection screen.

It will be observed that the rear edges 18 and 19 of the upper and lower extended reflecting surfaces 9' and 10' are curved in plan view so that the picture area of the screen with which these surfaces co-operate may be of cylindrical shape with curvature about a vertical axis.

The extended reflecting surfaces will preferably have reflection characteristics identical with the reflection characteristics of the picture area. Thus if the picture area is formed by a screen comprising a sheet of, for example, thermoplastic material suitably surfaced to have partially-specular reflection characteristics, then conveniently the lateral and upper extended reflecting surfaces will be formed of the same material as the screen and a sheet of similar material stretched over a suitable framework or support to form the lower extended reflecting surface.

When a picture is projected on to the picture area of a screen furnished with extended reflecting surfaces as above described, the extended reflecting surfaces will be illuminated by projected rays incident near the margins of the picture area and reflected thereby; since the extended reflecting surfaces have partially-specular reflection characteristics, such light will be reflected outwardly away from the picture area. The extended reflecting surfaces will also be illuminated by any "spill-over" of the picture if the marginal projected rays should not coincide exactly with the junctions between the picture area and the extended reflecting surfaces.

Thus in practice it will be found that the illumination of the extended reflecting surfaces will decrease from the inner margins to the extremities thereof, the fuzz-diffusing inner margins having a brightness substantially equal to that of the picture area. Since planes intersecting the picture area at the junction thereof with each extended reflecting surface are preferably substantially tangential to the extremities of the opposite extended reflecting surface, these extremities will receive next to no light reflected by the picture area and hence the extremities of the extended reflecting surfaces will have an apparent brightness approximately equal to that of the ambient surrounding illumination level.

Whilst optimum conditions are attained when the marginal rays incident on the picture area are tangential to the extended reflecting surfaces at their junctions with the picture area, it will be apparent that in certain cases such surfaces will mask the picture area margins for viewers very distant from the central normal to the picture area; thus in certain circumstances, e.g. in a very wide or deep theatre, it may be desirable to arrange the extended reflecting surfaces so that such masking of the picture area is obviated. It has been found that satisfactory results are obtained when the tangential planes to the extended reflecting surfaces, at their junctions with the picture area, are normal to the picturea area or the plane containing the margins thereof when the picture area is curved) and the performance of the extended reflecting surfaces is not seriously impaired when such tangential planes diverge outwardly, by a few degrees, from the normals to the picture area (or the plane containing the margins thereof).

Experiment has shown that a partially-specular projection screen having partially-specular extended reflecting surfaces disposed as above described permits a high brightness level in the picture area to be viewed comfortably and without eye-strain by viewers, margins of the picture area being surrounded by an area of substantial brightness which brightness diminishes progressively from the said margins of the picture area. Local highlights adjacent to the margins of the picture area are accompanied by transient highlights on the adjacent extended reflecting surface and this has the effect of making the picture area appear larger than it really is and gives the impression that the picture area is only part of a larger scene which is being viewed.

The invention has been described with particular reference to the projection of pictures in cinemas and the like but it is to be understood that the invention is also applicable to domestic picture projection, e.g. cinematography or projection television. For such purposes, in which small screens are employed, the extended reflecting surfaces could be quite simply formed upon substantially rigid self-supporting material, the extended reflecting surfaces being formed individually so that they may be readily packed for transport or storage, and adapted to be secured together and/or to a screen with which they are to be used. Conveniently, the extended reflecting surfaces could be hingedly attached to a rectangular frame and adapted to fold together for transport or storage.

I claim:

1. In combination with a projection screen having a partially-specular reflecting surface, means defining lateral and upper and lower convexly curved partially-specular reflecting surfaces which intersect and extend forwardly and outwardly away from the surface of said screen, the periphery of said screen being defined by the intersections between said surfaces and said screen, the tangential planes to the inner margins of said extended reflecting surfaces being substantially normal to the plane of the screen, the portions of said reflecting surfaces adjacent to said inner margins being positioned to receive and diffuse the marginal fuzz portion, if any, of a picture projected on said screen.

2. In combination, a projection screen having a partially-specular reflecting surface for displaying a picture projected thereon, said projected picture having fuzzy edge portions, means defining lateral and upper and lower convexly curved extended reflecting surfaces which intersect and extend outwardly and forwardly from the surface of said screen, the periphery of said screen being defined by the intersections between said surfaces and said screen, said surfaces being disposed to have said fuzzy edge portions projected on the inner marginal portions thereof, planes tangential to the inner edges of said inner marginal portions of said surfaces being steeply inclined with respect to said screen, whereby said fuzzy edge portions of said picture are dispersed by said inner marginal portions with a brightness compatible with the brightness of said picture.

3. The combination according to claim 2, wherein said extended reflecting surfaces comprise outer portions which merge smoothly into said inner marginal portions, said outer portions extending laterally and outwardly away from said inner marginal portions.

4. The combination according to claim 3, in which said outer portions extend laterally into a region which is effectively free from illumination by pictures projected on said screen, whereby the outer edges of said outer portions have a brightness commensurate with the ambient level of illumination.

References Cited in the file of this patent

UNITED STATES PATENTS

| | | |
|---|---|---|
| 1,496,581 | Kusterle | June 3, 1924 |
| 1,701,590 | Oliver et al. | Feb. 12, 1929 |
| 1,762,083 | Singer | June 3, 1930 |
| 2,117,857 | Schlanger et al. | May 17, 1938 |
| 2,148,260 | Comparato | Feb. 21, 1939 |
| 2,181,827 | Ziemmerman | Nov. 28, 1939 |
| 2,365,010 | Rogers | Dec. 12, 1944 |
| 2,383,493 | Mercer | Aug. 28, 1945 |
| 2,562,590 | Viglietta | July 31, 1951 |
| 2,665,611 | Smith | Jan. 12, 1954 |
| 2,779,938 | Pifer | Jan. 29, 1957 |

FOREIGN PATENTS

| | | |
|---|---|---|
| 541,808 | Great Britain | Dec. 12, 1941 |

OTHER REFERENCES

"International Projectionist," vol. 27, issue 1, Jan. 1952, page 17.